United States Patent
Haeusser

(10) Patent No.: US 10,895,330 B2
(45) Date of Patent: Jan. 19, 2021

(54) VALVE ARMATURE AND VALVE CARTRIDGE FOR A SOLENOID VALVE

(71) Applicant: Robert Bosch GmbH, Stuttgart (DE)

(72) Inventor: Bernd Haeusser, Neckarwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 16/329,161

(22) PCT Filed: Aug. 7, 2017

(86) PCT No.: PCT/EP2017/069934
§ 371 (c)(1),
(2) Date: Feb. 27, 2019

(87) PCT Pub. No.: WO2018/041548
PCT Pub. Date: Mar. 8, 2018

(65) Prior Publication Data
US 2019/0203847 A1   Jul. 4, 2019

(30) Foreign Application Priority Data

Aug. 30, 2016   (DE) .......................... 10 2016 216 347

(51) Int. Cl.
*F16K 31/06*   (2006.01)
*F16K 1/36*   (2006.01)
(Continued)

(52) U.S. Cl.
CPC .......... *F16K 31/0655* (2013.01); *B60T 8/363* (2013.01); *B60T 8/366* (2013.01);
(Continued)

(58) Field of Classification Search
CPC .... F16K 31/0665; F16K 31/0655; F16K 1/36; B60Y 2400/4045; B60T 15/028; B60T 8/367; B60T 8/366; B60T 8/363
(Continued)

(56) References Cited

U.S. PATENT DOCUMENTS 2,654,560 A * 10/1953 Smith ..................... F16K 41/04
251/332
5,467,961 A * 11/1995 Sausner .............. F16K 31/0658
251/129.15

(Continued)

FOREIGN PATENT DOCUMENTS

DE            39 05 969 A1   8/1990
DE   10 2004 012 526 A1   10/2004
(Continued)

OTHER PUBLICATIONS

International Search Report corresponding to PCT Application No. PCT/EP2017/069934, dated Oct. 10, 2017 (German and English language document) (7 pages).

*Primary Examiner* — Matthew W Jellett
(74) *Attorney, Agent, or Firm* — Maginot, Moore & Beck LLP

(57) ABSTRACT

A valve armature for a solenoid valve has a basic body consisting of a magnetically conductive metal. On one end of the basic body is arranged a depression which receives a tappet having a closing element. A tappet basic body consists of plastic and forms an interference fit with the basic body. A valve cartridge for a solenoid valve has such a valve armature, in which case, the basic body has an annular groove which is connected to the depression. The annular groove receives plastic deformations of the tappet basic body which form a form fit with the annular groove and fix the tappet basic body in the depression.

9 Claims, 3 Drawing Sheets

(51) Int. Cl.
  *B60T 8/36* (2006.01)
  *B60T 15/02* (2006.01)

(52) U.S. Cl.
  CPC ............... *B60T 8/367* (2013.01); *F16K 1/36* (2013.01); *F16K 31/0665* (2013.01); *B60T 15/028* (2013.01)

(58) Field of Classification Search
  USPC .................. 251/129.07, 129.15; 303/119.2
  See application file for complete search history.

(56) References Cited

U.S. PATENT DOCUMENTS

| | | | | |
|---|---|---|---|---|
| 6,453,930 | B1* | 9/2002 | Linkner, Jr. | B60T 8/363 |
| | | | | 137/15.18 |
| 6,705,589 | B2* | 3/2004 | Hofmann | B60T 8/367 |
| | | | | 251/129.08 |
| 6,877,717 | B2* | 4/2005 | Collins | H01F 7/081 |
| | | | | 251/129.15 |
| 7,240,893 | B2* | 7/2007 | Komaba | B60T 8/363 |
| | | | | 251/129.04 |
| 7,428,913 | B2* | 9/2008 | Benson | F16K 1/36 |
| | | | | 137/487.5 |
| 7,748,684 | B2* | 7/2010 | Ito | F16K 31/0658 |
| | | | | 251/129.15 |
| 9,046,186 | B2* | 6/2015 | Mitsumata | F16K 31/02 |
| 9,453,585 | B2* | 9/2016 | Sato | F16K 31/0696 |
| 9,714,721 | B2* | 7/2017 | Nanahara | B60T 7/042 |
| 2004/0251441 | A1* | 12/2004 | Schmitt | B60T 8/34 |
| | | | | 251/129.07 |
| 2011/0101772 | A1* | 5/2011 | Schepp | F16K 31/1223 |
| | | | | 303/10 |
| 2017/0292614 | A1* | 10/2017 | Haeusser | F16K 31/0655 |
| 2019/0085999 | A1* | 3/2019 | Chen | F16K 31/0655 |

FOREIGN PATENT DOCUMENTS

| | | |
|---|---|---|
| DE | 10 2014 217 447 A1 | 3/2016 |
| GB | 1 357 179 | 6/1974 |
| WO | 2011/097395 A2 | 8/2011 |

* cited by examiner

VALVE ARMATURE AND VALVE CARTRIDGE FOR A SOLENOID VALVE

This application is a 35 U.S.C. § 371 National Stage Application of PCT/EP2017/069934, filed on Aug. 7, 2017, which claims the benefit of priority to Serial No. DE 10 2016 216 347.7, filed on Aug. 30, 2016 in Germany, the disclosures of which are incorporated herein by reference in their entireties.

BACKGROUND

The disclosure proceeds from a valve armature for a solenoid valve according to the following description and from an associated valve cartridge for a solenoid valve according to the following description.

The prior art discloses normally open or normally closed solenoid valves, which are used, for example, as inlet valves or outlet valves in a hydraulic unit of a vehicle brake system. The hydraulic unit serves for performing control and/or feedback control operations in an antilock brake system (ABS) or a traction control system (TCS) or an electronic stability program system (ESP system), for building up or reducing pressure in corresponding wheel brake calipers. Such solenoid valves comprise a solenoid assembly and a valve cartridge, which comprises a guide sleeve, a valve armature having a closing element, guided in its axial movement inside the guide sleeve between a closed position and an open position, against the force of a return spring, and a valve sleeve connected to the guide sleeve and having a valve seat. Energizing of the solenoid assembly generates a magnetic force, which in an unenergized, open solenoid valve moves the valve armature with the closing element from the open position into the closed position, until the closing element strikes the corresponding valve seat and seals off the latter. In the unenergized state the return spring moves the valve armature with the closing element, and the closing element lifts off from the valve seat and opens the latter. In an unenergized, closed solenoid valve, the valve armature with the closing element is moved from the closed position into the open position by the energizing of the solenoid assembly and the closing element lifts out of the valve seat and opens the latter. If the current is then cut off, the return spring moves the solenoid armature with the closing element in the direction of the valve seat, until the closing element strikes the valve seat and seals off the latter. The solenoid valves described generate a so-called closing noise when the closing element, which comprises a hardened closing body, which is designed as a steel ball, for example, strikes the valve seat likewise composed of hardened steel.

The use of tappets with closing elements which have plastic basic bodies is a known way of reducing these switching noises. These are pressed into the hardened basic body of the valve armature, which is preferably made of iron or steel.

The published patent application DE 10 2014 217 447 A1, for example, describes a valve armature for a solenoid valve and a valve cartridge for a solenoid valve having such a valve armature. A depression, which receives a tappet having a closing element, is arranged at one end of the valve armature. The closing element is with a valve seat together, in order to adjust a fluid flow between at least two flow openings. Here a basic body of the tappet may be composed of plastic and may form an interference fit with the basic body of the valve cartridge. The basic body of the tappet thereby acts as an elastic damping element for the metal closing member and damps a pulse produced when the closing member strikes the valve seat.

SUMMARY

The valve armature according to the disclosure, intended for a solenoid valve and having the features of the following description, and the corresponding valve cartridge, intended for a solenoid valve and having the features of the following description, by contrast have the advantage that by modifying the valve armature the tappet is always pressed firmly into the basic body of the valve armature. Since the basic body of the valve armature and the tappet basic body have different coefficients of thermal expansion, the components may expand differently in the event of temperature fluctuations. As a result, settling of the plastic basic body can occur, so that the compression between the valve armature and the tappet may be reduced. Depending on the material and the type of interference fit, there is the possibility of the tappet working loose. As a result, on opening of the valve, the closing element of the loose tappet could remain in the valve seat, so that the valve does not open in the desired way. In embodiments of the present disclosure, the additional positive interlock ensures that the tappet basic body is always pressed firmly in the basic body of the valve armature. The interference fit is designed so that over-pressing occurs, which causes incipient flow in the softer plastic material of the tappet basic body, forming plastic deformations. The additional annular groove in the harder basic body of the valve armature affords an additional free space, into which the plastic of the tappet basic body can flow. The desired additional positive interlock is thereby achieved, allowing the tappet to be permanently fixed.

Moreover, by designing the tappet basic body as a plastic part, closing noise occurring as the valve closes can advantageously be reduced and optimally even eliminated almost entirely.

Embodiments of the present disclosure therefore also contribute to an improvement in the noise/vibration/hardness (NVH) behavior of the vehicle, in that the intrusive noises occurring as the solenoid valve closes are reduced and at best altogether avoided. This allows the vehicle brake system to be designed as a one-box system and the hydraulic unit to be bolted directly to the splash wall of the vehicle, since there are no intrusive closing noises passing into the vehicle interior.

Embodiments of the present disclosure provide a valve armature for a solenoid valve, which comprises a basic body of a magnetically conductive metal, on one end of which a depression is arranged, which receives a tappet having a closing element. A tappet basic body is composed of plastic and forms an interference fit with the basic body. Here the basic body has an annular groove which is connected to the depression and which receives plastic deformations of the tappet basic body, which form a positive interlock with the annular groove and additionally fix the tappet basic body in the depression.

A valve cartridge for a solenoid valve is furthermore proposed, having a guide sleeve; a valve armature according to the disclosure which is guided in its axial movement inside the guide sleeve between a closed position and an open position, against the force of a return spring, and which comprises a tappet having a closing element; and a valve sleeve, connected to the guide sleeve and having a valve seat, which is arranged between at least one first flow opening and at least one second flow opening. The closing element in the closed position interacts with the valve seat to seal the latter and interrupts a fluid flow between at least the one first flow opening and at least the one second flow opening. The closing element in the open position is lifted off from the valve seat and allows the fluid flow between at least the one first flow opening and at least the one second flow opening.

The measures and developments cited in the following description afford advantageous improvements of the valve armature for a solenoid valve specified in the following description.

In an advantageous embodiment of the valve armature the depression may take the form of a blind hole. In designing the interference fit it is advantageous if the over-pressing is augmented to such a degree that the flow limit of the plastic material of the tappet basic body is reached. The annular groove is thereby filled with the flowing plastic material that forms the plastic deformations. Since flaking can occur on the tappet basic body, the blind hole bore is advantageously capable of securely enclosing the flaked particles.

In a further advantageous embodiment of the valve armature the annular groove may be arranged at the end of a contact zone between a wall of the depression and the tappet basic body. Moreover, the annular groove may form an edge to the depression in the direction of the opening. This edge between the annular groove and the depression preferably has a right angle. Since in pressing the tappet basic body in the depression of the basic body of the valve armature increased compressive stresses are generated at the end of the contact zones of both bodies, this effect can be utilized in order to increase the prestressing at the edge and to improve the flow process. It is therefore advantageous if the annular groove is applied at the end of the contact zone of the two components.

In a further advantageous embodiment of the valve armature the depression may have an insertion bevel, in order to facilitate the insertion of the tappet basic body. The tappet basic body may furthermore have an annular shoulder, onto the end face of which the closing element is formed. Here an end face of the annular shoulder remote from the closing element may be matched to the insertion bevel. The annular shoulder allows the press-fitting tool to be applied without damaging the closing element.

In a further advantageous embodiment of the valve armature the dimensions of the tappet basic body can be matched to the dimensions of the depression. The tappet basic body may take the form of a stepped cylinder, for example, or a cylinder having an annular shoulder. The closing element may be designed as a spherical cup, for example.

Exemplary embodiments of the disclosure are represented in the drawing and are described in more detail in the following description. In the drawing the same reference numerals denote components or elements which perform the same or similar functions.

DETAILED DESCRIPTION

Figure 1:
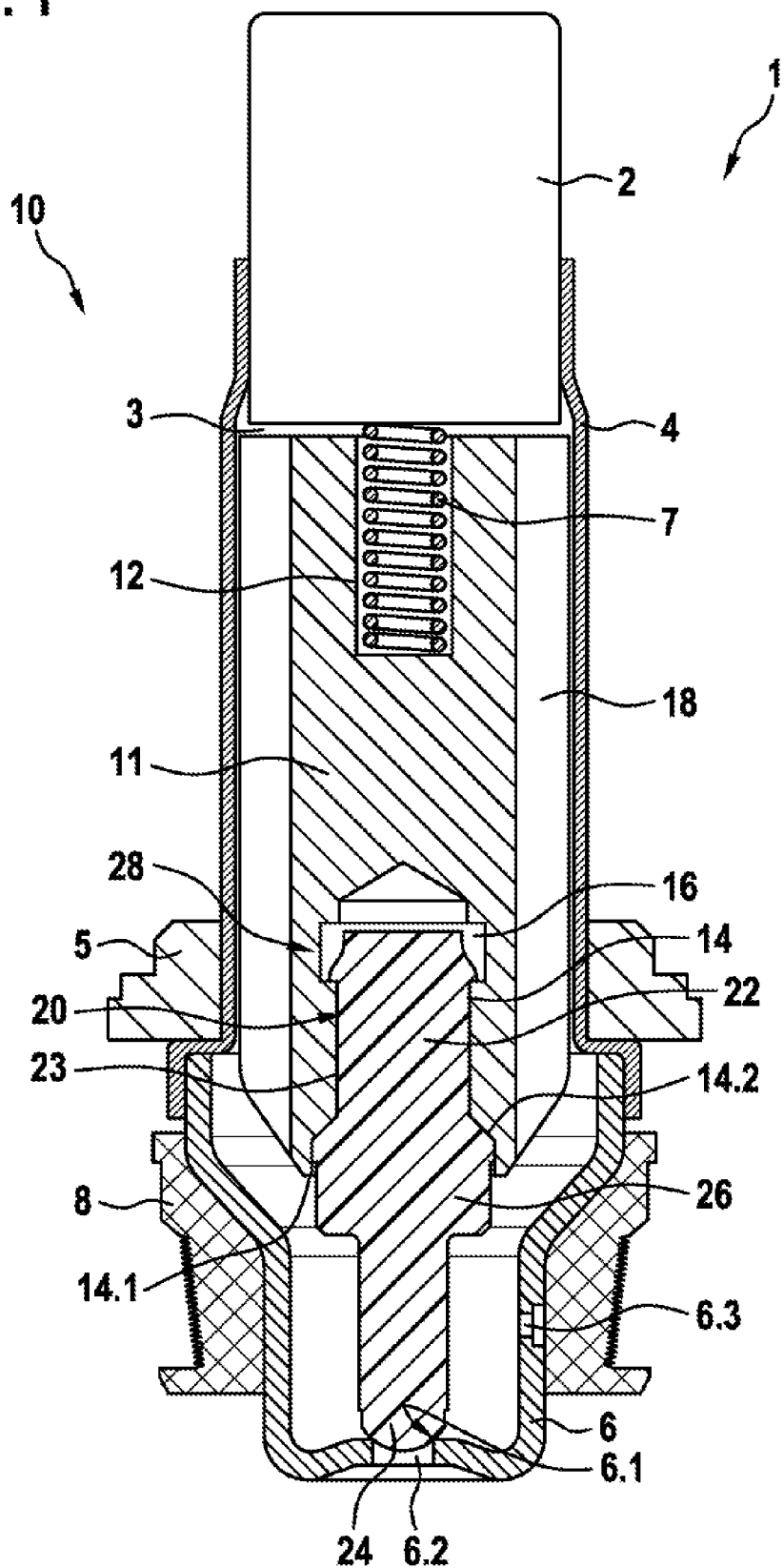
FIG. 1 shows a schematic, perspective sectional representation of an exemplary embodiment of the valve cartridge according to the disclosure for a solenoid valve, with an exemplary embodiment of a valve armature according to the disclosure.

As can be seen from FIG. 1, the exemplary embodiment represented showing a valve cartridge 1 according to the disclosure for a solenoid valve comprises a pole core 2; a guide sleeve 4 connected to the pole core 2; a valve armature 10, which is guided in its axial movement inside the guide sleeve 4 between a closed position and an open position, against the force of a return spring 7, and which comprises a tappet 20 having a closing element 24; and a valve sleeve 6, connected to the guide sleeve 4 and having a valve seat 6.1, which is arranged between at least one first flow opening 6.2 and at least one second flow opening 6.3. On energizing of a solenoid assembly (not further represented), that is to say when an electrical current is applied to a coil winding of the solenoid assembly via electrical connections, the axially moveable valve armature 10 is moved inside the guide sleeve 4 by a magnetic force generated, against the force of the return spring 7. The maximum possible lift of the valve armature 10 or of the closing element 24 is predetermined by an air gap 3 between the pole core 2 and the valve armature 10. Equalizing grooves 18 are moreover provided, which connect the air gap 3 to a valve chamber. As can further be seen from FIG. 1, the closing element 24 in the closed position shown interacts with the valve seat 6.1 to seal the latter and interrupts a fluid flow between at least the one first flow opening 6.2 and at least the one second flow opening 6.3. In an open position (not shown further) the closing element 14 is lifted off from the valve seat 6.1 and allows the fluid flow between at least the one first flow opening 6.2 and at least the one second flow opening 6.3.

As can further be seen from FIGS. 1 to 5, a basic body 11, composed of a magnetically conductive metal, of the valve armature 10, at one end comprises a depression 14, which receives the tappet 20 having the closing element 24. A tappet basic body 22 is composed of plastic and forms an interference fit with the basic body 11. Here the basic body 11 comprises an annular groove 16, which is connected to the depression 14 and which receives plastic deformations of the tappet basic body 22, which form a positive interlock with the annular groove 16 and additionally fix the tappet basic body 22 in the depression 14. In the exemplary embodiment shown the tappet basic body 11 is produced from a thermoplastic as a plastic injection-molded part. The interference fit is designed so that an over-pressing occurs, which causes incipient flow in the softer plastic material of the tappet basic body 22, forming the plastic deformations.

Figure 2:
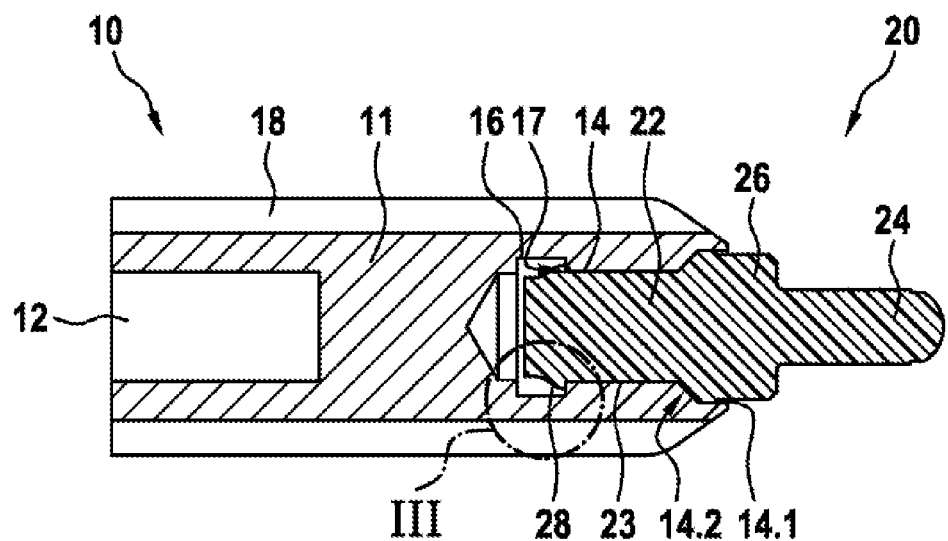
FIG. 2 shows a schematic longitudinal section of the valve armature according to the disclosure in FIG. 1.
Figure 3:
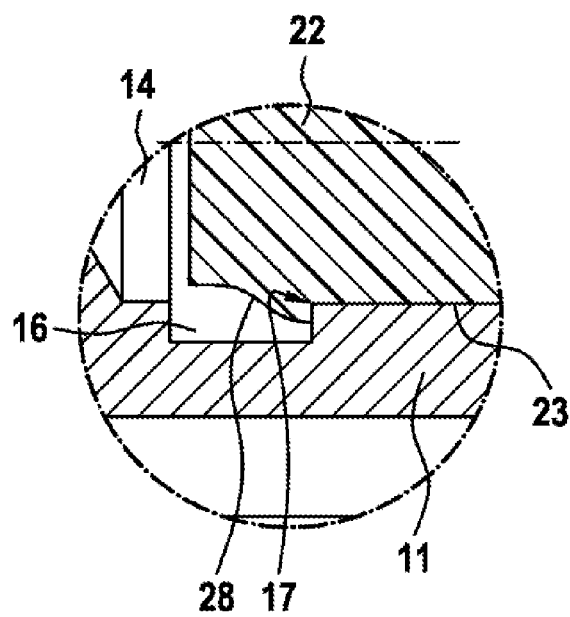
FIG. 3 shows a representation of the detail III in FIG. 2.
Figure 4:
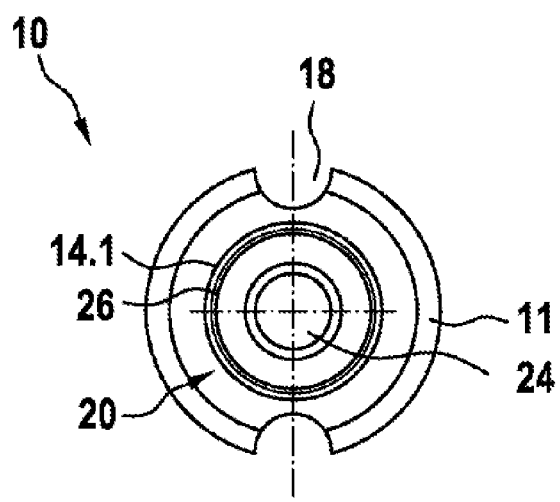
FIG. 4 shows a schematic front view of the valve armature in FIGS. 1 and 2.
Figure 5:
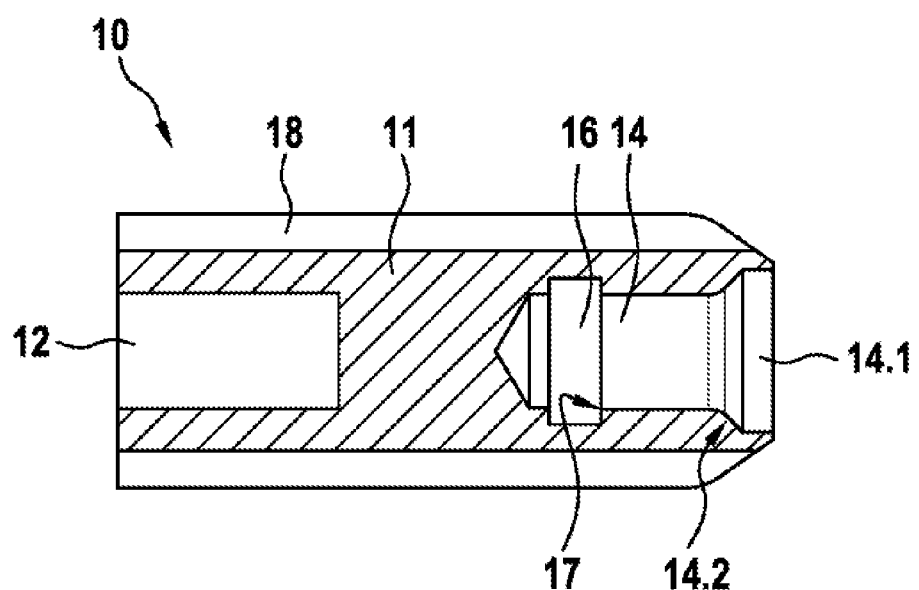
FIG. 5 shows a schematic longitudinal section of the basic body of the valve armature according to the disclosure in FIGS. 1 to 4.

As can further be seen from FIGS. 1, 2 and 5, the basic body 11 of the valve armature 10 at the other end comprises a spring socket 12, on the base of which the return spring 7 is supported.

As can further be seen from FIGS. 1, 2 and 5, the depression 14 is designed as a blind hole in the exemplary embodiment represented. Here the annular groove 16 is arranged at the end of a contact zone 23 between a wall of the depression 14 and the tappet basic body 22. The annular groove 16 moreover forms an edge 17 to the depression 14 in the direction of the opening 14.1. In the exemplary embodiment shown the edge 17 has a right angle between the annular groove 16 and the depression 14.

As can further be seen from FIGS. 1 and 2, the closing element 20 in the exemplary embodiment shown comprises a cylindrical basic body 22 having an annular shoulder 26, the dimensions of which are matched to the dimensions of the depression 14. A spherical cup-shaped closing element 24 is moreover formed onto an end face of the annular shoulder 26. Furthermore, the depression 14 has an insertion bevel 14.2, to which an end face of the annular shoulder 26 remote from the closing element is matched. Other suitable geometric shapes may obviously also be used for the depression 14 and the closing element 24. Thus, the closing element 24 may also be designed as a cone or truncated cone.

As can further be seen from FIG. 1, the valve cartridge 1 shown having the exemplary embodiment of the valve armature 10 may be calked by way of a valve bushing 5 in a corresponding seating bore of a fluid block, not represented in further detail. Moreover, a radial filter 8 for filtering dirt particles out of the fluid flow is arranged in the valve sleeve 6 in the area of at least the one second flow opening 6.3.

The exemplary embodiment shown relates to a valve cartridge 1 for a normally closed solenoid valve. The valve armature 10 may also be used, however, in a valve cartridge (not shown further) of a normally open solenoid valve.

Embodiments of the present disclosure provide a valve armature and a valve cartridge for a solenoid valve, which through an additional positive interlock between the tappet basic body and the basic body of the valve armature ensure that the tappet basic body is always pressed firmly in the basic body of the valve armature, regardless of any temperature fluctuations and different coefficients of thermal expansion.

The invention claimed is:

1. A valve armature for a solenoid valve, comprising:
a tappet having a tappet basic body and a closing element, the tappet basic body composed of plastic; and
a basic body of a magnetically conductive metal, the basic body defining a depression arranged on one end of the basic body, the depression having an opening through which the tappet basic body is configured to be received in the depression,
wherein the basic body has an annular groove that is connected to the depression and spaced from the opening so as to form an edge to the depression in the direction of the opening, and
wherein the tappet basic body is configured to form an interference fit with the basic body, the interference fit causing plastic deformations of the tappet basic body, which are received in the annular groove and form a positive interlock with the edge so as to fix the tappet basic body in the depression.

2. The valve armature as claimed in claim 1, wherein the plastic is a thermoplastic.

3. The valve armature as claimed in claim 1, wherein the depression is a blind hole.

4. The valve armature as claimed in claim 1, wherein the annular groove is arranged at the end of a contact zone between a wall of the depression and the tappet basic body.

5. The valve armature as claimed in claim 1, wherein the edge between the annular groove and the depression has a right angle.

6. The valve armature as claimed in claim 1, wherein the depression has an insertion bevel.

7. The valve armature as claimed in claim 6, wherein:
the tappet basic body comprises an annular shoulder,
the closing element is formed onto an end face of the annular shoulder,
a further end face of the annular shoulder remote from the closing element is matched to the insertion bevel.

8. The valve armature as claimed in claim 1, wherein dimensions of the tappet basic body are matched to dimensions of the depression.

9. A valve cartridge for a solenoid valve, comprising:
a guide sleeve;
a valve armature guided in its axial movement inside the guide sleeve between a closed position and an open position, against the force of a return spring, the valve armature including a tappet having a tappet basic body and a closing element, the tappet basic body composed of plastic; and
a valve sleeve connected to the guide sleeve, the valve sleeve having a valve seat, which is arranged between at least one first flow opening and at least one second flow opening,
wherein:
the closing element in the closed position interacts with the valve seat to seal the valve seat and interrupts a fluid flow between at least the one first flow opening and at least the one second flow opening,
the closing element in the open position is lifted off from the valve seat and allows the fluid flow between at least the one first flow opening and at least the one second flow opening,
the valve armature further includes a basic body of a magnetically conductive metal, the basic body defining a depression arranged on one end of the basic body, the depression having an opening through which the tappet basic body is configured to be received in the depression,
the basic body has an annular groove that is connected to the depression and spaced from the opening so as to form an edge to the depression in the direction of the opening, and
the tappet basic body is configured to form an interference fit with the basic body, the interference fit causing plastic deformations of the tappet basic body, which are received in the annular groove and form a positive interlock with the edge so as to fix the tappet basic body in the depression.

* * * * *